(12) United States Patent
Zhang et al.

(10) Patent No.: US 10,286,488 B2
(45) Date of Patent: May 14, 2019

(54) ACOUSTO-OPTICS DEFLECTOR AND MIRROR FOR LASER BEAM STEERING

(71) Applicant: INTEL CORPORATION, Santa Clara, CA (US)

(72) Inventors: Chong Zhang, Chandler, AZ (US); Islam A. Salama, Scottsdale, AZ (US)

(73) Assignee: INTEL CORPORATION, Santa Clara, CA (US)

(*) Notice: Subject to any disclaimer, the term of this patent is extended or adjusted under 35 U.S.C. 154(b) by 586 days.

(21) Appl. No.: 14/909,724

(22) PCT Filed: Mar. 6, 2015

(86) PCT No.: PCT/US2015/019179
§ 371 (c)(1),
(2) Date: Feb. 2, 2016

(87) PCT Pub. No.: WO2016/144290
PCT Pub. Date: Sep. 15, 2016

(65) Prior Publication Data
US 2017/0036301 A1 Feb. 9, 2017

(51) Int. Cl.
*B23K 26/082* (2014.01)
*B23K 26/382* (2014.01)
(Continued)

(52) U.S. Cl.
CPC ........ *B23K 26/082* (2015.10); *B23K 26/0821* (2015.10); *B23K 26/382* (2015.10);
(Continued)

(58) Field of Classification Search
CPC ... G02B 26/101; G02B 26/124; H01S 3/0071; H01S 3/2232; H01S 3/1611;
(Continued)

(56) References Cited

U.S. PATENT DOCUMENTS 4,552,456 A * 11/1985 Endo ................. G01S 17/10
342/70
5,502,001 A * 3/1996 Okamoto ........... G01B 11/0608
219/121.69

(Continued)

FOREIGN PATENT DOCUMENTS

JP 2002-244072 A 8/2002
KR 10-2014-0043524 A 4/2014
WO WO98-27450 A1 7/1998

OTHER PUBLICATIONS

International Search Report and Written Opinion dated Nov. 27, 2015 for International Application No. PCT/US2015/019179, 10 pages.

(Continued)

*Primary Examiner* — Eric S Stapleton
(74) *Attorney, Agent, or Firm* — Schwabe, Williamson & Wyatt, P.C.

(57) ABSTRACT

Embodiments of the present disclosure are directed towards an acousto-optics deflector and mirror for laser beam steering and associated techniques and configurations. In one embodiment, a laser system may include an acousto-optics module to deflect a laser beam in a first scanning direction of the laser beam on an integrated circuit (IC) substrate when the IC substrate is in a path of the laser beam and a mirror having at least one surface to receive the laser beam from the acousto-optics module, the mirror to move to control position of the laser beam in a second scanning direction, wherein the second scanning direction is substantially perpendicular to the first scanning direction. Other embodiments may be described and/or claimed.

14 Claims, 4 Drawing Sheets

(51) Int. Cl.
  *H01S 3/00* (2006.01)
  *G02B 26/10* (2006.01)
  *G02B 26/12* (2006.01)
  *H01S 3/223* (2006.01)
  *H01S 3/16* (2006.01)
  *B23K 101/42* (2006.01)

(52) U.S. Cl.
  CPC ......... *G02B 26/101* (2013.01); *G02B 26/124* (2013.01); *H01S 3/0071* (2013.01); *B23K 2101/42* (2018.08); *H01S 3/1611* (2013.01); *H01S 3/1643* (2013.01); *H01S 3/2232* (2013.01)

(58) Field of Classification Search
  CPC . H01S 3/1643; B23K 26/0821; B23K 26/082; B23K 26/382; B23K 2201/42
  USPC .................................................. 219/121.71
  See application file for complete search history.

(56) References Cited

U.S. PATENT DOCUMENTS

| | | | | | |
|---|---|---|---|---|---|
| 5,579,148 | A * | 11/1996 | Nishikawa | ........... | G02B 26/101 235/462.36 |
| 5,600,478 | A * | 2/1997 | Stevens | ...................... | B41J 2/47 347/260 |
| 5,837,962 | A * | 11/1998 | Overbeck | .............. | B23K 26/06 219/121.68 |
| 5,903,380 | A * | 5/1999 | Motamedi | .................. | B81B 3/0035 359/202.1 |
| 6,467,345 | B1 * | 10/2002 | Neukermans | .......... | B82Y 15/00 73/504.02 |
| 6,531,677 | B2 * | 3/2003 | Arai | .................... | B23K 26/0604 219/121.61 |
| 6,961,355 | B1 * | 11/2005 | Yin | ......................... | H01S 3/109 372/25 |
| 8,222,126 | B2 * | 7/2012 | Tanaka | ................ | B23K 26/0738 438/487 |
| 2001/0022566 | A1 * | 9/2001 | Okazaki | ................. | B82Y 20/00 345/84 |
| 2002/0040893 | A1 * | 4/2002 | Arai | .................... | B23K 26/0604 219/121.71 |
| 2003/0189030 | A1 * | 10/2003 | Faour | ....................... | A61J 3/10 219/121.7 |
| 2004/0112879 | A1 * | 6/2004 | Mori | ....................... | B23K 26/02 219/121.69 |
| 2004/0182929 | A1 * | 9/2004 | Aoshima | ............. | H01S 3/09415 235/454 |
| 2004/0222197 | A1 * | 11/2004 | Hiramatsu | ............. | B23K 26/03 219/121.7 |
| 2005/0013328 | A1 * | 1/2005 | Jurgensen | .......... | B23K 26/0604 372/6 |
| 2005/0087522 | A1 * | 4/2005 | Sun | .................... | B23K 26/0604 219/121.71 |
| 2005/0145605 | A1 * | 7/2005 | Faour | ....................... | A61J 3/10 219/121.7 |
| 2005/0237895 | A1 * | 10/2005 | Tanaka | ................ | B23K 26/0738 369/97 |
| 2005/0238071 | A1 * | 10/2005 | Oka | ........................ | H01S 3/109 372/21 |
| 2005/0263498 | A1 * | 12/2005 | Hiramatsu | .......... | B23K 26/032 219/121.7 |
| 2005/0263690 | A1 * | 12/2005 | Araya | .................. | G02B 21/002 250/234 |
| 2006/0249491 | A1 * | 11/2006 | Jurgensen | .......... | B23K 26/0643 219/121.69 |
| 2007/0284347 | A1 * | 12/2007 | Morikazu | .......... | B23K 26/0626 219/121.71 |
| 2008/0009132 | A1 * | 1/2008 | Morikazu | ......... | H01L 21/76898 438/637 |
| 2008/0011723 | A1 * | 1/2008 | Morikazu | ............ | B23K 26/067 219/121.68 |
| 2008/0031291 | A1 * | 2/2008 | Kobayashi | ........... | B23K 26/032 372/29.012 |
| 2008/0037596 | A1 * | 2/2008 | Kobayashi | ......... | B23K 26/0853 372/9 |
| 2008/0061042 | A1 * | 3/2008 | Nomaru | ............... | B23K 26/073 219/121.67 |
| 2008/0067157 | A1 * | 3/2008 | Morikazu | .......... | B23K 26/0853 219/121.71 |
| 2008/0105665 | A1 * | 5/2008 | Kondo | ................. | B23K 26/067 219/121.77 |
| 2008/0110868 | A1 * | 5/2008 | Morikazu | ............ | B23K 26/067 219/121.67 |
| 2008/0179302 | A1 * | 7/2008 | Morikazu | .......... | B23K 26/0734 219/121.71 |
| 2008/0212999 | A1 * | 9/2008 | Masuda | ................ | G02B 26/124 399/158 |
| 2008/0299783 | A1 * | 12/2008 | Bruland | ............... | B23K 26/082 438/795 |
| 2009/0015896 | A1 * | 1/2009 | Masuda | ................ | G02B 26/124 359/205.1 |
| 2009/0236323 | A1 * | 9/2009 | Sun | ...................... | H05K 3/0035 219/121.71 |
| 2011/0210105 | A1 * | 9/2011 | Romashko | ......... | B23K 26/0732 219/121.72 |
| 2011/0267415 | A1 * | 11/2011 | Ohba | ....................... | B41J 2/473 347/224 |
| 2011/0317727 | A1 * | 12/2011 | Furuya | .................. | H01S 3/0627 372/27 |
| 2012/0002263 | A1 * | 1/2012 | Furuya | .................. | G03B 21/28 359/238 |
| 2012/0012762 | A1 * | 1/2012 | Nowak | .................. | B82Y 20/00 250/504 R |
| 2012/0241427 | A1 * | 9/2012 | Maltsev | ............. | B23K 26/0732 219/121.85 |
| 2012/0273472 | A1 * | 11/2012 | Unrath | ................ | B23K 26/0732 219/121.73 |
| 2013/0044360 | A1 * | 2/2013 | Heinemann | ............... | H04N 1/04 359/204.3 |
| 2013/0148674 | A1 * | 6/2013 | Nowak | ............... | H01S 5/06216 372/26 |
| 2013/0176541 | A1 * | 7/2013 | Gyoutoku | ................. | H01S 5/10 353/31 |
| 2013/0222506 | A1 * | 8/2013 | Yoshida | .................. | G02B 26/10 347/118 |
| 2013/0222507 | A1 * | 8/2013 | Nakano | .................. | G02B 26/10 347/118 |
| 2013/0222863 | A1 * | 8/2013 | Yoshida | ................. | G02B 26/10 358/474 |
| 2013/0313440 | A1 * | 11/2013 | Chuang | ................ | G01N 21/956 250/372 |
| 2014/0197140 | A1 * | 7/2014 | Unrath | ................... | B23K 26/03 219/121.62 |
| 2014/0204454 | A1 * | 7/2014 | Li | ......................... | G02B 26/10 359/305 |
| 2014/0263223 | A1 * | 9/2014 | Unrath | ................. | B23K 26/032 219/121.81 |

OTHER PUBLICATIONS

Office Action and Search Report dated Feb. 22, 2017 for Taiwanese Patent Application No. 105103333, 17 pages.

* cited by examiner

ACOUSTO-OPTICS DEFLECTOR AND MIRROR FOR LASER BEAM STEERING

CROSS REFERENCE TO RELATED APPLICATIONS

The present application is a national phase entry under 35 U.S.C. § 371 of International Application No. PCT/US2015/019179, filed Mar. 6, 2015, entitled "ACOUSTO-OPTICS DEFLECTOR AND MIRROR FOR LASER BEAM STEERING", which designated, among the various States, the United States of America. The Specification of the PCT/US2015/019179 Application is hereby incorporated by reference.

FIELD

Embodiments of the present disclosure generally relate to the field of laser systems, and more particularly, to an acousto-optics deflector and mirror for laser beam steering and associated techniques and configurations.

BACKGROUND

Ongoing efforts are being made to improve throughput of laser drilling to form vias in an integrated circuit (IC) substrate in order to reduce cost. Some current approaches include increasing a galvo frequency of a laser system, splitting of the laser beam, reducing a shot count per via and/or increasing an X-Y table speed. Among such factors, the galvo frequency may be a primary contributor to throughput time. However, galvo frequency may be difficult to increase because of limitations of the speed of mechanical mirror movement in a galvo system. In laser projection patterning (LPP), a projection mask may be needed for patterning and laser energy utilization may be low due to the laser energy that is blocked by the mask.

The background description provided herein is for the purpose of generally presenting the context of the disclosure. Unless otherwise indicated herein, the materials described in this section are not prior art to the claims in this application and are not admitted to be prior art by inclusion in this section.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
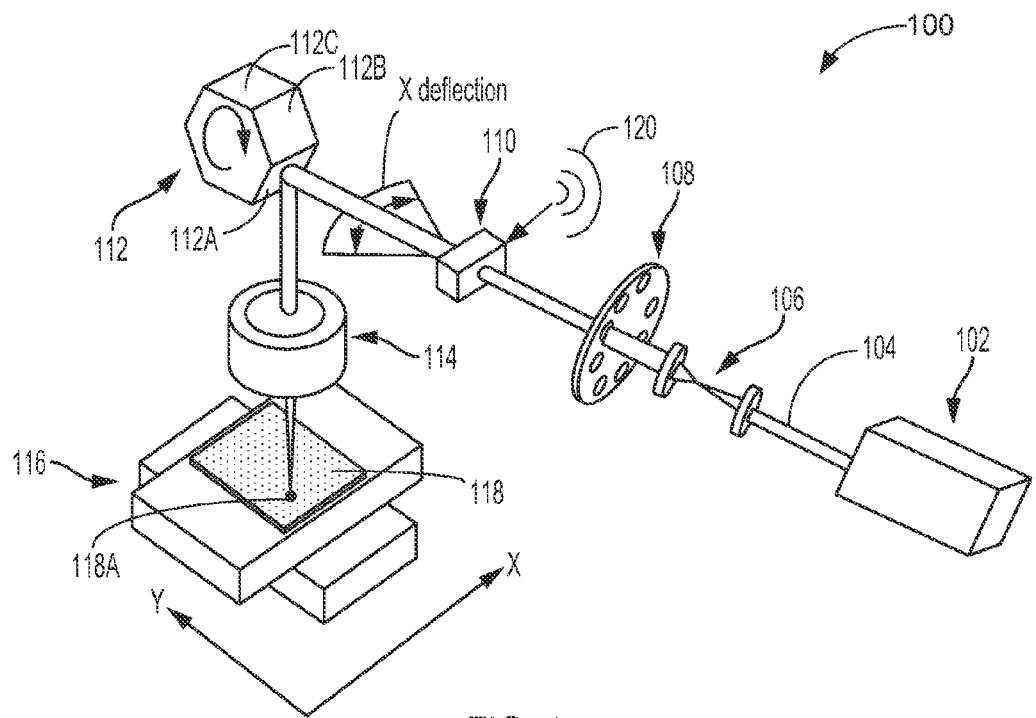
FIG. 1 schematically illustrates a perspective view of an example laser system including a single acousto-optic deflector and a mirror, in accordance with some embodiments.

Embodiments of the present disclosure describe an acousto-optics deflector and mirror for laser beam steering and associated techniques and configurations. In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

In various embodiments, the phrase "a first feature formed, deposited, or otherwise disposed on a second feature" may mean that the first feature is formed, deposited, or disposed over the second feature, and at least a part of the first feature may be in direct contact (e.g., direct physical and/or electrical contact) or indirect contact (e.g., having one or more other features between the first feature and the second feature) with at least a part of the second feature.

As used herein, the term "module" may refer to, be part of, or include an Application Specific Integrated Circuit (ASIC), an electronic circuit, a system-on-chip chip (SoC), a processor (shared, dedicated, or group) and/or memory (shared, dedicated, or group) that execute one or more software or firmware programs, a combinational logic circuit, and/or other suitable components that provide the described functionality.

FIG. 1 schematically illustrates a perspective view of an example laser system 100 including a single acousto-optic deflector (hereinafter "AO deflector 110") and a mirror 112, in accordance with some embodiments. According to various embodiments, the laser system 100 may include a laser resonator 102, laser beam 104, collimator 106, aperture mask 108, AO deflector 110, mirror 112, lens 114 and X-Y table 116, coupled as can be seen.

The laser system 100 may be configured to drill vias (e.g., laser-drilled vias 118A) in an integrated circuit (IC) substrate 118 using the laser beam 104. According to various embodiments, the laser system 100 may use mask-less laser direct patterning (LDP) or laser direct imaging (LDI) to pattern the IC substrate 118 with laser-drilled vias. In some embodiments, the AO deflector 110 may be used to steer the laser beam 104 in a respective first scanning direction (e.g., X-direction) and the mirror 112 may be used to steer the laser beam 104 in a second scanning direction (e.g., Y-direction) on the IC substrate 118 when the IC substrate 118 is in a path of the laser beam 104 (e.g., on the X-Y stage as depicted). The first scanning direction may be substantially perpendicular or perpendicular to the first scanning direction.

According to various embodiments, the mirror 112 may include at least one surface to receive the laser beam 104 from the AO deflector 110. In some embodiments, the mirror 112 may be a polygon mirror having multiple surfaces that correspond with multiple sides of the polygon. For example, in the depicted embodiment, the mirror 112 is a hexagon mirror having six surfaces (e.g., surfaces 112A, 112B, 112C) corresponding with six sides of the polygon, as can be seen. The mirror 112 may have more or fewer surfaces than depicted in other embodiments. For example, in some embodiments, the mirror 112 may have a single surface or more than six surfaces.

The mirror 112 may be configured to move to control the position of the laser beam 104 in the second scanning direction. In some embodiments, the mirror 112 may rotate, in one embodiment, the mirror 112 may continuously rotate at a constant speed to steer the laser beam 104 in the second scanning direction. In some embodiments, the mirror 112 may have translation movement to move the laser beam 104 in the second scanning direction.

The AO deflector 110 may be used to deflect the laser beam 104 in the first scanning direction. In some embodiments, the AO deflector 110 may deflect the laser beam 104 according to an acoustic signal 120. For example, the laser beam 104 may be deflected at the AO deflector 110 by varying an acoustic signal 120 that is input to the AO deflector 110. A time period for acoustic signal 120 change may be during (e.g., within) a laser pulse off time in order to avoid a laser beam 104 position error in the laser system 100. According to various embodiments, the timing of turning the laser beam 104 on/off may be synchronized with deflection at the AO deflector 110 and/or the mirror 112. The laser system may include a synch mechanism between the AO deflector 110 with capability of turning on/off the laser and the polygon mirror 112.

The laser system 100 may perform two-dimensional (2D) patterning by the laser beam 104 using a combination of steering with the mirror 112 and the AO deflector 110. In some embodiments, the AO deflector 110 may be configured to turn the laser beam 104 on and off. For example, the AO deflector 110 may switch the laser beam 104 on and off to generate a one dimensional pattern in the first scanning direction. The deflected laser beam 104 may reflect off of the mirror 112 rotating at a constant speed. The rotation of the polygon mirror may allow laser beam scanning in the second scanning direction to provide 2D patterning.

According to various embodiments, the AO deflector 110 may be part of an acousto-optics (AO) module. In the laser system 100 of FIG. 1, the AO module may include or be a single AO deflector 110 to deflect the laser beam 104 in a first scanning direction only (e.g., a single AO deflector). In other embodiments, such as in the laser system 300 of FIG. 3, the AO module may include or be multiple AO deflectors (e.g., AO deflectors 210A, 210B) to deflect the laser beam 104 in two or more scanning directions.

In some embodiments, the laser system 100 may further include a laser resonator 102 to output the laser beam 104. The laser beam 104 may be of any suitable type including, for example, a carbon dioxide ($CO_2$) laser or a $2^{nd}/3^{rd}$ harmonic neodymium-doped yttrium aluminum garnet (Nd: YAG) laser (532 nm/355 nm). Other suitable types of lasers may be used in other embodiments. In some embodiments, the laser system 100 may further include a collimator 106 in a path of the laser beam 104 to affect a size (e.g., diameter) of the laser beam 104. In some embodiments, the laser system 100 may further include an aperture mask 108 in a path of the laser beam 104 to provide a spatial filter for the laser beam 104, which may provide a desired shape (e.g., circular) of the laser beam 104. In some embodiments, the laser system 100 may further include a lens 114 such as a scanning lens to focus or reduce a size of the laser beam 104. In some embodiments, the laser system 100 may further include an X-Y table 116 to hold and move (e.g., in the X or Y direction) an IC substrate 118 in a path of the laser beam 104 to facilitate the formation of laser-drilled vies 118A in the IC substrate 118.

A laser drilling processing speed of the laser system 100 may increase relative to a traditional galvanometer (galvo) laser system because the mirror 112 may not need to accelerate and/or decelerate for beam positioning and the AO deflector 110 may provide non-mechanical beam steering. The laser system 100 may further provide increased beam position accuracy relative to a traditional galvo laser system. Using the AO deflector 110 and mirror 112 to steer the laser beam 104 may improve alignment accuracy relative to traditional configurations. In an LDP or LDI configuration, efficiency of laser energy utilization may improve (e.g., for same laser input power, the laser system 100 may have higher process speed) because there may be no mask for the patterning.

Figure 2:
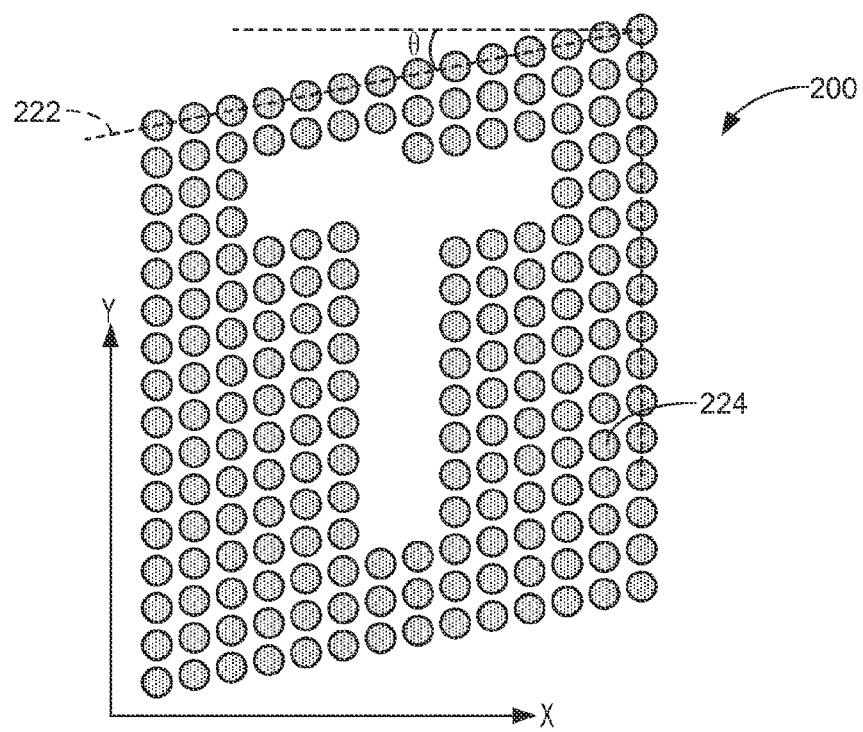
FIG. 2 schematically illustrates an example pattern that is generated by the laser system of FIG. 1, in accordance with some embodiments.

FIG. 2 schematically illustrates an example pattern 200 that is generated by the laser system 100 of FIG. 1, in accordance with some embodiments. In FIG. 2, each of the features 224 may represent one or more laser pulses by the laser beam 104 on the IC substrate 118 of FIG. 1 and the X-direction is perpendicular to the Y-direction. Due to a continuous rotation of the mirror 112, a first scanning direction 222 of the laser system 100 may not be exactly perpendicular to the second scanning direction (e.g., the Y-direction), as can be seen.

An angle, θ, between the first scanning direction 222 and the X-direction may depend on a variety of factors. For example, in Equation 1, θ may be calculated according to the following, where d is a laser beam pitch, k is a laser frequency, and v is a rotation speed of the mirror (e.g., mirror 112 of FIG. 1):

$$\theta = \operatorname{atan}\left(\frac{v}{dk}\right) \quad [1]$$

According to various embodiments, the phrase "substantially perpendicular" includes a deviation from exactly perpendicular by the angle θ.

Figure 3:
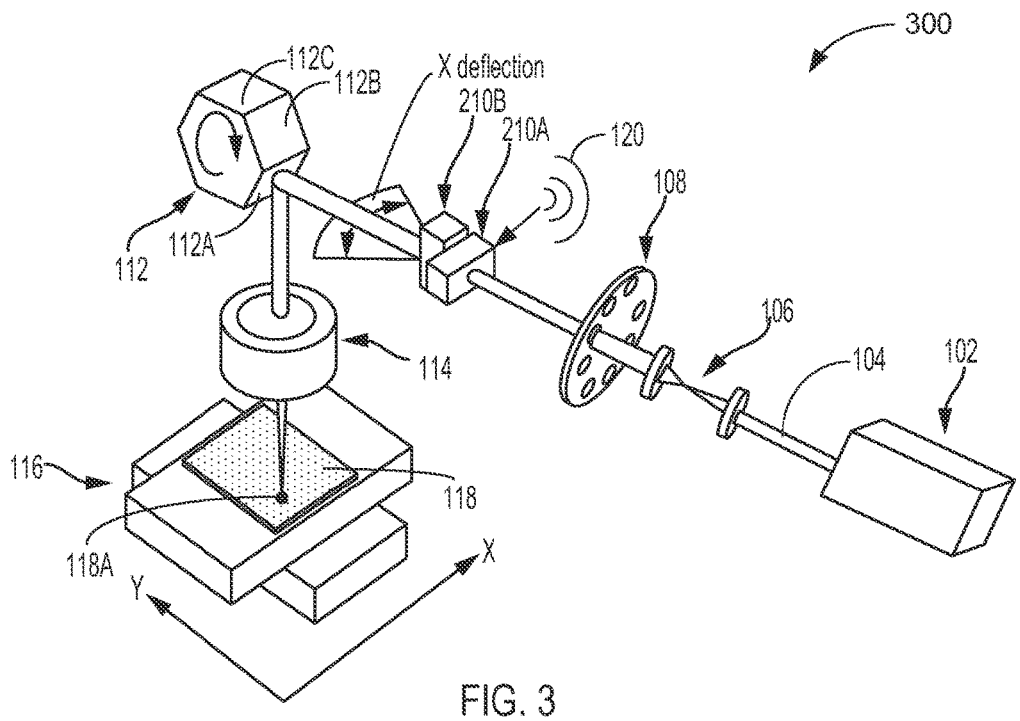
FIG. 3 schematically illustrates a perspective view of an example laser system including multiple acousto-optic deflectors and a mirror, in accordance with some embodiments.

FIG. 3 schematically illustrates a perspective view of an example laser system 300 including multiple acousto-optic deflectors 210A, 210B and a mirror 112, in accordance with some embodiments. The laser system 300 may generally comport with embodiments described in connection with the laser system 100, except that in the laser system 300, the AO module may include two AO deflectors 210A, 210B.

A first AO deflector 210A of the laser system 300 may deflect the laser beam 104 in the X-direction (e.g., similar to the AO deflector 110 of FIG. 1). For example, the first AO deflector 210A may deflect the laser beam 104 by varying an acoustic signal 120 that is input to the first AO deflector 210A. A second AO deflector 210B of the laser system 300 may deflect the laser beam 104 in the Y-direction (e.g., according to another acoustic signal similar to acoustic signal 120). In some embodiments, the second AO deflector 210B may track the movement (e.g., rotation) of the mirror 112 and/or compensate for any error in surface flatness of the surface(s) (e.g., surfaces 112A, 112B, 112C) of the mirror 112. For example, the laser beam 104 deflected by the first AO deflector 210A and the second AO deflector 210B may hit the mirror 112 rotating at constant speed. The rotation of the mirror 112 may steer the laser beam 104 in the Y-direction. Since the first AO deflector 210A and the second AO deflector 210B can position the laser beam 104 in 2D (e.g., the X-direction and the Y-direction), the laser beam 104 may not need to be switched on and off for the pattern generation and better laser energy utilization may be realized in the laser system 300 relative to the laser system 100 as a result. In some embodiments, the laser beam 300 may remain on during 2D pattern generation (e.g., forming laser-drilled vias 118A in the IC substrate 118).

According to various embodiments, the AO deflector 110, 210A, or 210B of FIG. 1 or 3 may be composed of a material configured to propagate an acoustic wave such as, for example, silica, tellurium dioxide (TeO$_2$), or germanium (Ge). The AO deflector may be composed of other suitable materials in other embodiments.

Figure 4:
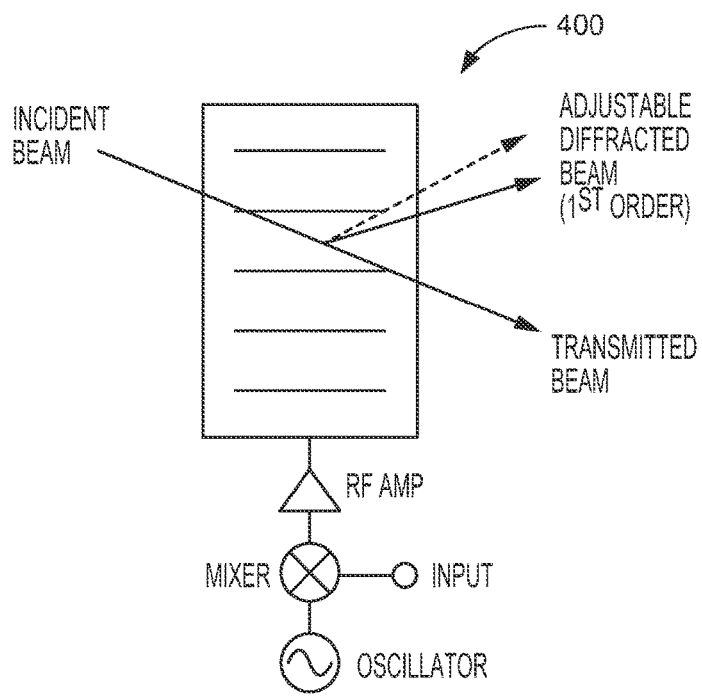
FIG. 4 schematically illustrates an operating principle of an acousto-optic deflector, in accordance with some embodiments.

FIG. 4 schematically illustrates an operating principle of an acousto-optic deflector 400, which may represent the AO deflector 110 of FIG. 1 or first AO deflector 210A and second AO deflector 210B of FIG. 3, in accordance with some embodiments. The acoustic wave generated by a radio frequency (RF) driver may produce a sinusoidal refractive index gradient, which may act as a diffraction grating to an incoming laser beam (e.g., laser beam 104 of FIG. 1 or 3). For example, in some embodiments, an acoustic signal may be input into a mixer together with an output from an oscillator and output to an RF amp, which may be coupled with the AO deflector 400, as can be seen. Varying the acoustic signal input to the AO deflector 400 may allow steering of the 1$^{st}$ order diffracted beam from the incident beam to provide an adjustable diffracted beam, as can be seem. The transmitted beam may pass through the AO deflector.

In some embodiments, the 1$^{st}$ order diffracted beam may be utilized in the AO deflector 400. For example, the diffracted angle, θ, may be defined according to Equation 2 as follows, where λ is the optical wavelength of the laser beam in air, $V_a$ is the acoustical velocity of the material (e.g., crystal) of the AO deflector, $f_a$ is the acoustic frequency of the material of the AO deflector, and $\theta_b$ is the Bragg angle:

$$\theta = \frac{\lambda f_a}{V_a} = 2\theta_b \quad [2]$$

The acoustic frequency $f_a$ may be controlled by the RF driver, which may steer the laser beam position without the mechanical motion that may be required for a traditional galvo positioning system. A diffraction efficiency of the AO deflector 400 may be defined $I_{diffracted}/I_{incident}$, which may depend on acoustic energy $I_{acoustic}$ of the AO deflector 400, as defined in Equation 3 as follows, where L is a length of an electrode of the AO deflector 400, H is a height of the electrode. M is a figure of merit of the optical material as defined in Equation 4:

$$\frac{I_{diffracted}}{I_{incident}} = \sin^2\left(\frac{\pi}{\sqrt{2}\lambda}\sqrt{\frac{L}{H}MI_{acoustic}}\right) \quad [3]$$

The figure of merit M is defined in Equation 4 as follows, where n is refractive index, p is strain-optic coefficient, ρ is density, and $V_a$ is acoustical velocity:

$$M = \frac{n^6 p^2}{\rho V_a^3} \quad [4]$$

The diffraction efficiency $I_{diffracted}/I_{incident}$ may be adjusted by adjusting the acoustic energy $I_{acoustic}$. For example, in some embodiments, by adjusting the acoustic energy $I_{accoustic}$ through the RF driver power control, the diffraction efficiency may be adjusted from 0 to 90%.

The AO deflector may include no moving parts, in some embodiments. When a new acoustic wave occupies the whole aperture, the laser beam 104 can be deflected to a new position. The response time or aperture time, τ, may be calculated according to Equation 5, where D is the aperture size (e.g., millimeters), and $V_a$ is the acoustic velocity (on the order of 10$^3$ meters/second in the crystal):

$$\tau = \frac{D}{V_a} \quad [5]$$

In some embodiments, the response time τ may be on the order of microseconds, which may be a substantial improvement relative to a response time of a galvo system, which may have a response time on the order of milliseconds. The operating frequency of the AO deflector may be 3 orders of magnitude higher than the galvo system, according to various embodiments.

When the mirror (e.g., mirror 112 of FIG. 1 or 3) is rotating at constant speed, no inertia may need to be overcome, which may allow a high rotation speed and improved position accuracy. In some embodiments, the mirror may rotate on the order of ~10,000 revolutions per minute (RPM). With a 100 millimeter focal length, 10,000 RPM may provide a scanning speed of about 105 meters/second, which may be substantially faster than a galvo scanning speed (e.g., less than 10 meters/second). Thus, the mirror may provide a scanning speed that is at least 1 order of magnitude greater than a galvo system, according to various embodiments.

Figure 5:
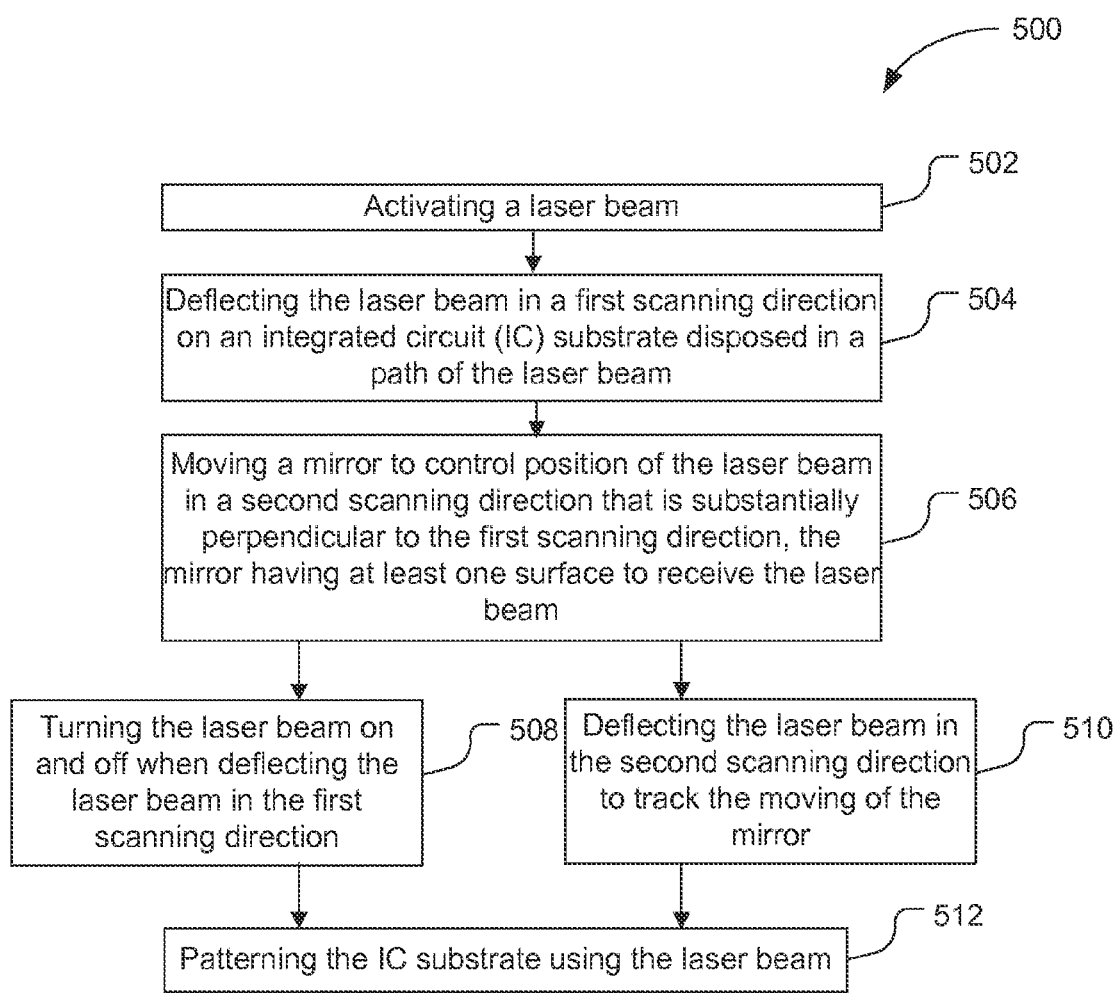
FIG. 5 schematically illustrates a flow diagram for a method of steering a laser beam to pattern an integrated circuit (IC) substrate, in accordance with some embodiments.

FIG. 5 schematically illustrates a flow diagram for a method 500 of steering a laser beam (e.g., laser beam 104 of FIG. 1 or 3) to pattern an integrated circuit (IC) substrate (e.g., IC substrate 118 of FIG. 1 or 3), in accordance with some embodiments. The method 500 may comport with techniques described in connection with FIGS. 1-4 and vice versa.

At 502, the method 500 may include activating a laser beam. Activating the laser beam may include, for example, powering on a laser beam light source and stimulating the emission of electromagnetic radiation in the form of a laser.

At 504, the method 500 may include deflecting the laser beam in a first scanning direction (e.g., X-direction of FIG. 1 or 3) on an IC substrate disposed in a path of the laser beam. According to various embodiments, the laser beam may be deflected in the first scanning direction by an AO deflector (e.g., AO deflector 110 of FIG. 1 or AO deflector 210A of FIG. 3) of an AO module. Deflecting the laser beam in the first scanning direction may be accomplished, for example, by varying an acoustic signal (e.g., acoustic signal 120 of FIG. 1 or 3) input into the AO deflector.

At 506, the method 500 may include moving a mirror to control the position of the laser beam in a second scanning direction (e.g., Y-direction of FIG. 1 or 3) that is substantially perpendicular to the first scanning direction, the mirror having at least one surface to receive the laser beam (e.g., from the AO module). According to various embodiments, the mirror may rotate at a constant speed during patterning of laser-drilled vies with the laser system (e.g., laser system 100 of FIG. 1 or 3).

At 508, the method 500 may include turning the laser beam on and off when deflecting the laser beam in the first scanning direction. The action at 508 may be performed, for example, by the laser system 100 of FIG. 1 having a single AO deflector. In some embodiments, the AO module/deflector may be configured to turn the laser beam on and off when varying the acoustic signal to deflect the laser beam. For example, in one embodiment, the AO module may turn the laser beam off when varying the acoustic signal to deflect the laser beam and then back on subsequent to varying the acoustic signal.

Alternatively, at 510, the method 500 may include deflecting the laser beam in the second scanning direction to track the moving of the mirror. The action at 510 may be performed, for example, by the laser system 300 of FIG. 3 having a first AO deflector (e.g., first AO deflector 210A) and second AO deflector (e.g., second AO deflector 210B). In some embodiments, the deflecting at 504 may be performed by the first AO deflector of an AO module and the deflecting at 510 may be performed by a second AO deflector of the AO module.

At 512, the method 500 may include patterning the IC substrate using the laser beam. For example, in some embodiments, the patterning may include forming laser-drilled vias (e.g., laser-drilled vias 118A of FIG. 1 or 3) in a 2D pattern (X-direction and Y-direction) on the IC substrate.

Various operations are described as multiple discrete operations in turn, in a manner that is most helpful in understanding the claimed subject matter. However, the order of description should not be construed as to imply that these operations are necessarily order dependent. For example, the actions of method 500 may be performed in any suitable order according to various embodiments.

Figure 6:
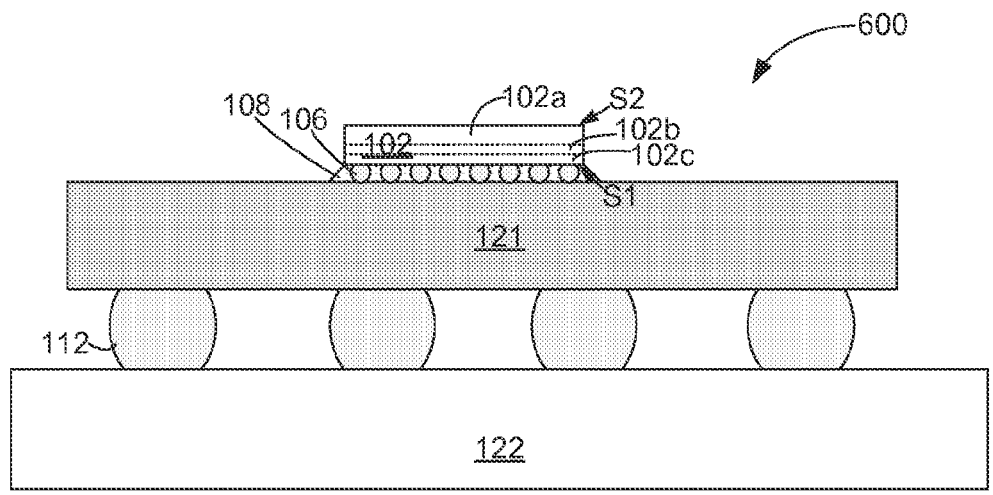
FIG. 6 schematically illustrates a cross-section side view of an example IC package assembly, in accordance with some embodiments.

Embodiments of the present disclosure may be implemented into a system (e.g., a computing device) using any suitable hardware and/or software to configure as desired. FIG. 6 schematically illustrates a cross-section side view of an example IC package assembly 600, in accordance with some embodiments. According to various embodiments, the laser system 100 or 300 of FIG. 1 or 3 may be used to form laser-drilled vies in an IC substrate such as, for example, the package assembly 121 or circuit board 122. In some embodiments, the IC package assembly 600 may include one or more dies (hereinafter "die 102") electrically and/or physically coupled with a package assembly 121 (sometimes referred to as a "package substrate"). In some embodiments, the package assembly 121 may be electrically coupled with a circuit board 122, as can be seen.

The die 102 may represent a discrete product made from a semiconductor material (e.g., silicon) using semiconductor fabrication techniques such as thin film deposition, lithography, etching, and the like used in connection with forming complementary metal-oxide-semiconductor (CMOS) devices. In some embodiments, the die 102 may be, include, or be a part of a radio frequency (RF) die. In other embodiments, the die may be, include, or be a part of a processor, memory, SoC, or ASIC.

In some embodiments, an underfill material 108 (sometimes referred to as an "encapsulant") may be disposed between the die 102 and the package assembly 121 to promote adhesion and/or protect features of the die 102 and package assembly 121. The underfill material 108 may be composed of an electrically insulative material and may encapsulate at least a portion of the die 102 and/or die-level interconnect structures 106, as can be seen. In some embodiments, the underfill material 108 is in direct contact with the die-level interconnect structures 106.

The die 102 can be attached to the package assembly 121 according to a wide variety of suitable configurations including, for example, being directly coupled with the package assembly 121 in a flip-chip configuration, as depicted. In the flip-chip configuration, an active side, S1, of the die 102 including active circuitry is attached to a surface of the package assembly 121 using die-level interconnect structures 106 such as bumps, pillars, or other suitable structures that may also electrically couple the die 102 with the package assembly 121. The active side S1 of the die 102 may include transistor devices, and an inactive side, S2, may be disposed opposite to the active side S1, as can be seen.

The die 102 may generally include a semiconductor substrate 102a, one or more device layers (hereinafter "device layer 102b"), and one or more interconnect layers (hereinafter "interconnect layer 102c"). The semiconductor substrate 102a may be substantially composed of a bulk semiconductor material such as, for example, silicon, in some embodiments. The device layer 102b may represent a region where active devices such as transistor devices are formed on the semiconductor substrate 102a. The device layer 102b may include, for example, structures such as channel bodies and/or source/drain regions of transistor devices. The interconnect layer 102c may include interconnect structures that are configured to route electrical signals to or from the active devices in the device layer 102b. For example, the interconnect layer 102c may include trenches and/or vias to provide electrical routing and/or contacts.

In some embodiments, the die-level interconnect structures 106 may be configured to route electrical signals between the die 102 and other electrical devices. The electrical signals may include, for example, input/output (I/O) signals and/or power/ground signals that are used in connection with operation of the die 102.

In some embodiments, the package assembly 121 may include a multi-layer package substrate including, for example, build-up laminate layers. The package assembly 121 may include electrical routing features (not shown in FIG. 1) such as, for example, traces, pads, through-holes, laser-drilled vies, or lines configured to route electrical signals to or from the die 102. For example, the package assembly 121 may be configured to route electrical signals between the die 102 and components for wireless communication that are integrated within the package assembly, or between the die 102 and the circuit board 122, or between the die 102 and another electrical component (e.g., another die, interposer, interface, component for wireless communication, etc.) coupled with the package assembly 121.

The circuit board 122 may be a printed circuit board (PCB) composed of an electrically insulative material such as an epoxy laminate. For example, the circuit board 122 may include electrically insulating layers composed of materials such as, for example, polytetrafluoroethylene, phenolic cotton paper materials such as Flame Retardant 4 (FR-4), FR-1, cotton paper, and epoxy materials such as CEM-1 or CEM-3, or woven glass materials that are laminated together using an epoxy resin prepreg material. Interconnect structures (not shown) such as traces, trenches or vies may be formed through the electrically insulating layers to route the electrical signals of the die 102 through the circuit board 122. The circuit board 122 may be composed of other suitable materials in other embodiments. In some embodiments, the circuit board 122 is a motherboard.

Package-level interconnects such as, for example, solder balls 112 may be coupled with the package assembly 121 and/or the circuit board 122 to form corresponding solder joints that are configured to further route the electrical signals between the package assembly 121 and the circuit board 122. Other suitable techniques to physically and/or electrically couple the package assembly 121 with the circuit board 122 may be used in other embodiments.

The IC package assembly 600 may include a wide variety of other suitable configurations in other embodiments including, for example, suitable combinations of flip-chip and/or wire-bonding configurations, interposers, multi-chip package configurations including system-in-package (SiP) and/or package-on-package (PoP) configurations. Other suitable techniques to route electrical signals between the die 102 and other components of the IC package assembly 600 may be used in some embodiments.

Figure 7:
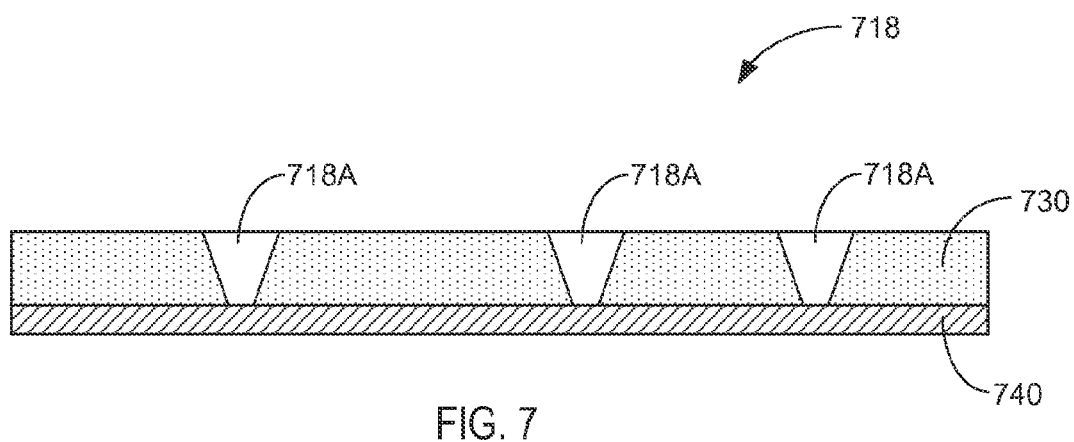
FIG. 7 schematically illustrates a cross-section side view of laser-drilled vials in an IC substrate, in accordance with some embodiments.

FIG. 7 schematically illustrates a cross-section side view of laser-drilled vias 718A in an IC substrate 718, in accordance with some embodiments. The IC substrate 718 may represent an example portion of an IC substrate 718, in some embodiments. One or more laser-drilled vias 718A may be formed through an electrically insulative material 730 such as, for example, an epoxy laminate layer. In some embodiments, the electrically insulative material 730 may be disposed on an electrically conductive material 740 such as, for example, a metal layer (e.g., copper). The laser-drilled vias 718A may have a tapered profile according to various embodiments. In some embodiments, the one or more laser-drilled vies 718A may be formed using the laser beam 104 of laser system 100 of FIG. 1 or the laser system 300 of FIG. 3. The one or more laser-drilled vies 718A may be formed in an IC substrate having other suitable configurations in other embodiments.

EXAMPLES

According to various embodiments, the present disclosure describes a laser system. Example 1 of a laser system may include an acousto-optics module to deflect a laser beam in a first scanning direction of the laser beam on an integrated circuit (IC) substrate when the IC substrate is in a path of the laser beam and a mirror having at least one surface to receive the laser beam from the acousto-optics module, the mirror to move to control position of the laser beam in a second scanning direction, wherein the second scanning direction is substantially perpendicular to the first scanning direction. Example 2 may include the laser system of Example 1, wherein the mirror is a polygon mirror having multiple surfaces corresponding with multiple sides of the polygon; and the at least one surface is one of the multiple surfaces. Example 3 may include the laser system of Example 2, wherein the polygon mirror has six surfaces corresponding with six sides of a hexagon and the at least one surface is one of the six surfaces. Example 4 may include the laser system of Example 1, wherein the mirror is configured to rotate at a constant speed. Example 5 may include the laser system of Example 1, wherein the acousto-optics module is configured to deflect the laser beam in the first scanning direction by varying an acoustic signal input into the acousto-optics module. Example 6 may include the laser system of Example 5, wherein the acousto-optics module includes a single acousto-optics deflector that is configured to turn the laser beam on and off. Example 7 may include the laser system of Example 5, wherein the acousto-optics module includes a first acousto-optics deflector to deflect the laser beam in the first scanning direction and a second acousto-optics deflector to deflect the laser beam in the second scanning direction. Example 8 may include the laser system of Example 7, wherein the second acousto-optics deflector is configured to track motion of the mirror. Example 9 may include the laser system of any of Examples 1-8, further comprising a lens disposed in a path of the laser beam between the mirror and a table upon which the IC substrate is to be placed when the IC substrate is to be patterned by the laser beam. Example 10 may include the laser system of Example 9, further comprising a laser resonator, a collimator disposed in the path of the laser beam between the resonator and the acousto-optics module, and an aperture mask disposed in the path of the laser beam between the resonator and the acousto-optics module. Example 11 may include the laser system of any of Examples 1-8, wherein the laser beam is a $CO_2$ laser beam or a $2^{nd}$ or $3^{rd}$ harmonic neodymium-doped yttrium aluminum garnet (Nd:YAG) laser.

According to various embodiments, the present disclosure describes a method. Example 12 of a method may include activating a laser beam, deflecting, by an acousto-optics module, the laser beam in a first scanning direction on an integrated circuit (IC) substrate disposed in a path of the laser beam, and moving a mirror to control position of the laser beam in a second scanning direction, the mirror having at least one surface to receive the laser beam from the acousto-optics module, wherein the second scanning direction is substantially perpendicular to the first scanning direction. Example 13 may include the method of Example 12, wherein moving the mirror comprises rotating the mirror at a constant speed. Example 14 may include the method of Example 12, wherein the mirror is a polygon mirror having multiple surfaces corresponding with multiple sides of the polygon and the at least one surface is one of the multiple surfaces. Example 15 may include the method of Example 14, wherein the polygon mirror has six surfaces corresponding with six sides of a hexagon and the at least one surface is one of the six surfaces. Example 16 may include the method of Example 12, wherein deflecting the laser beam in the first scanning direction is performed by varying an acoustic signal input into the acousto-optics module. Example 17 may include the method of Example 16, further comprising turning, by the acousto-optics module, the laser beam on and off when varying the acoustic signal. Example 18 may include the method of Example 16, wherein deflecting the laser beam in the first scanning direction is performed by a first acousto-optics deflector of the acousto-optics module, the method further comprising deflecting, by a second acousto-optics deflector of the acousto-optics module, the laser beam in the second scanning direction. Example 19 may include the method of Example 18, wherein deflecting, by the second acousto-optics deflector of the acousto-optics module, the laser beam in the second scanning direction tracks the moving of the mirror. Example 20 may include the method of Example 12, further comprising patterning the IC substrate using the laser beam.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. A laser system comprising:
an acousto-optics module that includes a first acousto-optics deflector to deflect a laser beam in a first scanning direction of the laser beam on an integrated circuit (IC) substrate when the IC substrate is in a path of the laser beam, and a second acousto-optics deflector to deflect the laser beam in a second scanning direction, wherein the second scanning direction is substantially perpendicular to the first scanning direction, wherein the first and second acousto-optics deflectors are free from moving parts, wherein a response time of the first or second acousto-optics deflector is proportionate to a size of an aperture receiving the laser beam and inversely proportionate to an acoustic velocity of a material comprising the first and second acousto-optics deflectors; and
a mirror coupled with the acousto-optics module, wherein the mirror includes multiple surfaces to receive the laser beam from the acousto-optics module, wherein the second acousto-optics deflector is configured to track motion of the mirror.

2. The laser system of claim 1, wherein:
the mirror is a polygon mirror, wherein the multiple surfaces correspond with multiple sides of the polygon.

3. The laser system of claim 2, wherein:
the polygon mirror has six surfaces corresponding with six sides of a hexagon; and
at least one surface is one of the six surfaces.

4. The laser system of claim 1, wherein the mirror is configured to rotate at a constant speed.

5. The laser system of claim 1, wherein the acousto-optics module is configured to deflect the laser beam in the first and second scanning directions by varying acoustic signal inputs into the acousto-optics module.

6. The laser system of claim 1, further comprising:
a lens disposed in a path of the laser beam between the mirror and a table upon which the IC substrate is to be placed when the IC substrate is to be patterned by the laser beam.

7. The laser system of claim 6, further comprising:
a laser resonator;
a collimator disposed in the path of the laser beam between the resonator and the acousto-optics module; and
an aperture mask disposed in the path of the laser beam between the resonator and the acousto-optics module.

8. The laser system of claim 1, wherein the laser beam is a $CO_2$ laser beam or a $2^{nd}$ or $3^{rd}$ harmonic neodymium-doped yttrium aluminum garnet (Nd:YAG) laser.

9. A method comprising:
activating a laser beam;
deflecting, by a first acousto-optics deflector of an acousto-optics module, the laser beam in a first scanning direction on an integrated circuit (IC) substrate disposed in a path of the laser beam, and deflecting, by a second acousto-optics deflector of the acousto-optics module, the laser beam in a second scanning direction, wherein the second scanning direction is substantially perpendicular to the first scanning direction, wherein the first and second acousto-optics deflectors are free from moving parts, wherein deflecting includes providing the deflecting with a response time of the first or second acousto-optics deflector that is proportionate to a size of an aperture receiving the laser beam and inversely proportionate to an acoustic velocity of a material comprising the first and second acousto-optics deflectors; and
moving a mirror coupled with the acousto-optics module, to control position of the laser beam, the mirror having multiple-surfaces to receive the laser beam from the acousto-optics module; and wherein the deflecting the laser beam by the second acousto-optics deflector includes tracking a motion of the mirror.

10. The method of claim 9, wherein moving the mirror comprises rotating the mirror at a constant speed.

11. The method of claim 9, wherein:
the mirror is a polygon mirror with multiple surfaces corresponding with multiple sides of the polygon.

12. The method of claim 11, wherein:
the polygon mirror has six surfaces corresponding with six sides of a hexagon; and
at least one surface is one of the six surfaces.

13. The method of claim 9, wherein deflecting the laser beam includes varying an acoustic signal input into the acousto-optics module.

14. The method of claim 9, further comprising:
patterning the IC substrate using the laser beam.

* * * * *